US009810184B2

(12) United States Patent

Schmid et al.

(10) Patent No.: US 9,810,184 B2
(45) Date of Patent: Nov. 7, 2017

(54) AIR FILTER DEVICE, ESPECIALLY FOR A MOTOR VEHICLE

(71) Applicant: MANN+HUMMEL GMBH, Ludwigsburg (DE)

(72) Inventors: Daniel Schmid, Sachsenheim (DE); Guenter Goerg, Moeglingen (DE); Timo Dirnberger, Marbach (DE); Ralf Dietz, Remseck (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 166 days.

(21) Appl. No.: 14/490,761

(22) Filed: Sep. 19, 2014

(65) Prior Publication Data

US 2015/0075126 A1 Mar. 19, 2015

(30) Foreign Application Priority Data

Sep. 19, 2013 (DE) ........................ 10 2013 015 497

(51) Int. Cl.

*B01D 35/24* (2006.01)
*F02M 35/024* (2006.01)
*F02M 35/10* (2006.01)
*F02M 35/02* (2006.01)

(52) U.S. Cl.

CPC .. *F02M 35/02416* (2013.01); *F02M 35/0204* (2013.01); *F02M 35/10144* (2013.01); *F02M 35/0203* (2013.01); *F02M 35/10013* (2013.01); *F02M 35/10137* (2013.01); *F02M 35/10262* (2013.01)

(58) Field of Classification Search

CPC ......... F02M 35/2416; F02M 35/10144; F02M 35/10262; F02M 35/10137; F02M 35/203–35/204; F02M 35/10013; F02M 35/24; B01D 46/05; B01D 46/525; B01D 46/528; B01D 46/2411

See application file for complete search history.

(56) References Cited

U.S. PATENT DOCUMENTS 5,512,074 A * 4/1996 Hanni ................ B01D 46/0005 55/484
7,501,004 B2 * 3/2009 Tschech ............. B01D 46/0005 123/198 E
7,658,777 B2 * 2/2010 Kopec ................ B01D 46/0005 55/385.3
2014/0224229 A1 * 8/2014 Brand ..................... F02B 33/02 123/563

* cited by examiner

*Primary Examiner* — Heidi Kelley
*Assistant Examiner* — Karla Hawkins
(74) *Attorney, Agent, or Firm* — James Hasselbeck

(57) ABSTRACT

An air filter device is provided with a filter housing and a filter element arranged in the filter housing. A frame part is connected to the filter element and frames the filter element at least over sections thereof circumferentially. The frame part is provided with an air duct receptacle that is adapted to receive an air duct. The frame part is arranged at least partially on an exterior side of the filter housing. The filter element is fastened by the frame part on the filter housing.

14 Claims, 5 Drawing Sheets

AIR FILTER DEVICE, ESPECIALLY FOR A MOTOR VEHICLE

CROSS-REFERENCE TO RELATED APPLICATION

This application claims the benefit of German patent application No. 10 2013 015 497.9 filed Sep. 19, 2013, the entire contents of the aforesaid German patent application being incorporated herein by reference.

BACKGROUND OF THE INVENTION

The invention concerns an air filter device, especially for a motor vehicle, especially for a truck, comprising a filter element that is received in a filter housing and, at least over sections thereof, is framed by a circumferentially extending frame part.

DE 10 2011 011 595 A1 discloses an air filter device for a motor vehicle which comprises, in a filter housing, a filter element that is connected at its inflow end face with a frame part which laterally projects past the circumferential surface of the filter element and serves for supporting it on the end face rim of the filter housing. In the inserted state, the frame part is resting on the rim of the filter housing and is forced by an attached cover, to be connected by securing clips with the filter housing, against the filter housing. The air supply is realized through the cover which is designed as a cyclone separator with a bottom part and a top part.

SUMMARY OF THE INVENTION

It is the object of the invention to configure an air filter device in a constructively simple manner.

This object is solved according to the invention in that the circumferentially extending frame part on the filter element forms an air duct receptacle for an air duct, wherein the frame part is arranged at least partially on the exterior side of the filter housing.

The dependent claims provide expedient further developments.

The air filter device according to the invention can be used in motor vehicles in order to subject the combustion air to be supplied to the internal combustion engine to filtration. Conceivable is a use in trucks as well as in passenger cars.

The air filter device has a filter housing and a filter element received therein that is partially or completely framed by a circumferentially extending frame part that forms a carrying frame. The frame part is located preferably at an end face of the filter element, in particular at the inflow end face.

The frame part can be used for securing and holding the filter element. Moreover, the frame part has the function of providing an air duct receptacle for an air duct which is part of the air flow passage through the air filter device. The frame part thus receives the air duct and connects the air duct with the filter element. The air duct serves preferably for supply of raw air to the raw or inflow side of the filter element; possible is however also an arrangement of the air duct at the clean or outflow side of the filter element and, accordingly, a configuration as clean air duct.

The frame part in the mounted state is arranged at least partially on the exterior side of the filter housing. In this way, it is possible to directly connect the air duct with the frame part; also, the externally positioned projecting section of the frame part can be used for connection with the filter housing. The frame part thus has a dual function: on the one hand, the connection of the filter element with the filter housing and, on the other hand, the connection of the air duct with the filter element. An additional attachment device for attachment of the air duct on the filter housing is not required.

The frame part is fastened, for example, by means of securing clips on the filter housing. The securing clip is located preferably on the exterior wall of the filter housing and can be brought into a form-fit securing position on the frame part.

The air duct is preferably inserted into the frame part so that the frame part surrounds the end face of the inserted air duct. Fastening and securing of the frame part on the filter housing is realized by means of the exterior side of the frame part, for example, by means of the aforementioned securing clips. The air duct can be optionally form-fittingly connected with the frame part, for example, by means of elastic springy locking noses on the exterior side of the air duct which, in the mounted state, project into recesses provided in the frame part. For detaching the air duct, the elastic locking noses can be pushed out of the recesses. By attachment of the frame part on the filter housing, the raw air duct is thus secured indirectly on the filter housing at the same time.

According to a further advantageous embodiment, the frame part is secured fluid-tightly on the filter housing in order to avoid leak flows. For this purpose, a sealing element is provided that is designed advantageously so as to extend circumferentially and is positioned in a circumferentially extending open receptacle in the frame part. In the mounted state, the sealing element is resting on the filter housing wall.

The sealing element can have correlated therewith a support bead provided at the filter housing; the support bead projects past the immediately neighboring sections of the filter housing wall and the sealing element is supported on the support bead. The support bead has advantageously a width that is reduced in comparison to the sealing element provided at the frame part so that, in the mounted state, the support bead is positioned with lateral spacing relative to the frame part walls. This reduces the risk of shearing off of the sealing element in case of a relative movement between filter element (or frame part) and filter housing. Also, it is avoided that a part of the projecting sealing element can be pinched between the filter housing and the frame part which could lead to destruction of the sealing element and also to a reduced sealing function.

According to a further expedient embodiment, the frame part is adhesively connected to the filter element. The adhesive connection is realized by means of a liquid adhesive which, in the not yet cured state, is filled into an adhesive receptacle which is positioned between the frame part and the filter element. In order to prevent that the liquid adhesive flows, prior to curing, along the exterior side of the filter element, a sealing lip is advantageously provided between the frame part and the filter element and delimits the adhesive receptacle between frame part and filter element. The sealing lip prevents an uncontrolled outflow of liquid adhesive during the connecting process between frame part and filter element. After completion of the connection, the sealing lip can even remain on the filter element or the frame part and can be inserted together with these components into the filter housing.

BRIEF DESCRIPTION OF THE DRAWINGS

Further advantages and expedient embodiments can be taken from the further claims, the figure description, and the drawings.

In the Figures, same components are provided with same reference characters.

DESCRIPTION OF PREFERRED EMBODIMENTS

Figure 1:
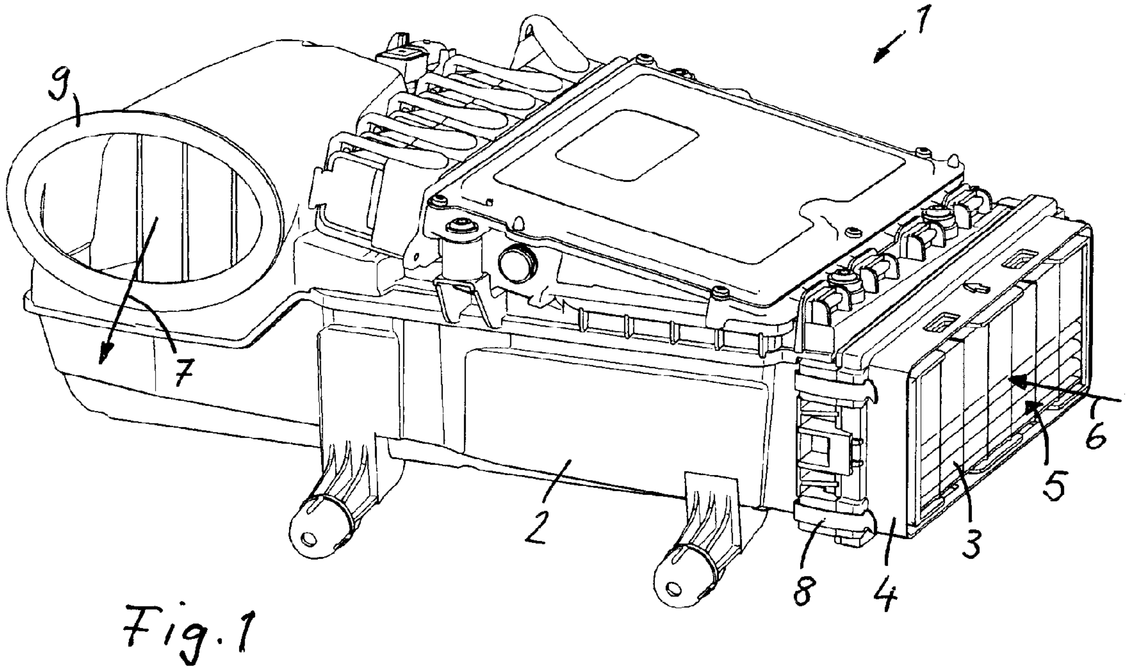
FIG. 1 shows in a perspective view an air filter device for a motor vehicle, comprising a filter housing and a filter element inserted at the end face of the filter housing and framed by a circumferentially extending frame part by means of which the filter element is secured on the filter housing.

In the Figures, an air filter device 1 for a motor vehicle, for example for a truck, is illustrated that is used for filtration of combustion air to be supplied to the internal combustion engine. The air filter device 1 has a filter housing 2 and a filter element 3 arranged therein and is framed at the end face in the area of an inflow side by a circumferentially extending frame part 4. The filter element 3 is embodied as a pleated filter bellows, for example.

The frame part 4 is located immediately adjacent to the inflow or raw side 5 of the filter element 3 to which air that is to be purified is supplied in the direction of arrow 6. After filtration, the purified air exits via the clean or outflow side of the filter element and exits the filter housing 2 through an outflow socket 9 in the direction of arrow 7. The filter element 3 is secured on the filter housing 2 by means of securing clips 8 which connect the frame part 4 with the filter housing 2. In the mounted state, the frame part 4 engages the end face edge of the filter housing and extends up to the externally positioned circumferential surface of the filter housing in the area adjacent to the insertion opening for the filter element 3.

Figure 2:
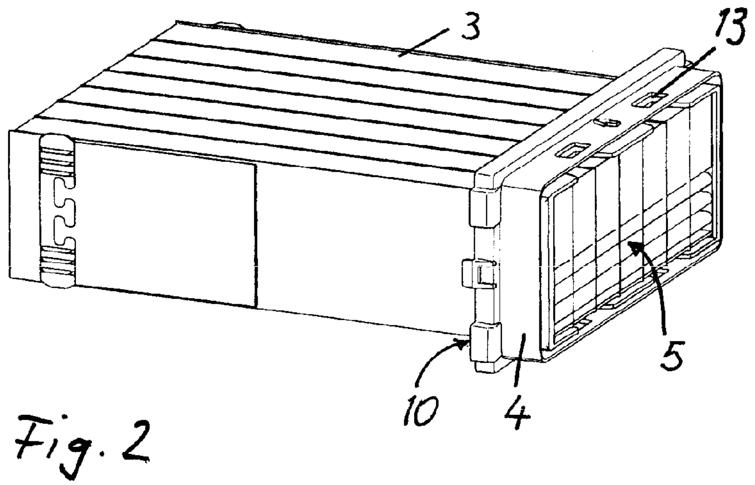
FIG. 2 shows a parallelepipedal filter element with frame part at an end face.

As can be seen in the individual illustration according to FIG. 2, the filter element 3 is of a parallelepipedal shape and has a rectangular cross-section. Accordingly, the inflow side 5 of the filter element 3 as well as the frame part 4 are rectangularly embodied also. The frame part 4 projects past the exterior sides of the filter element 3 with a projecting section. The end face of the projecting section of the frame part 4 forms a support surface; this support surface on the frame part 4 is identified with reference character 10. The support surface 10 is provided at the side which is facing away from the inflow side 5 and, in the mounted state of the frame part 4, it is resting on the open end face of the filter housing 2.

Figure 3:
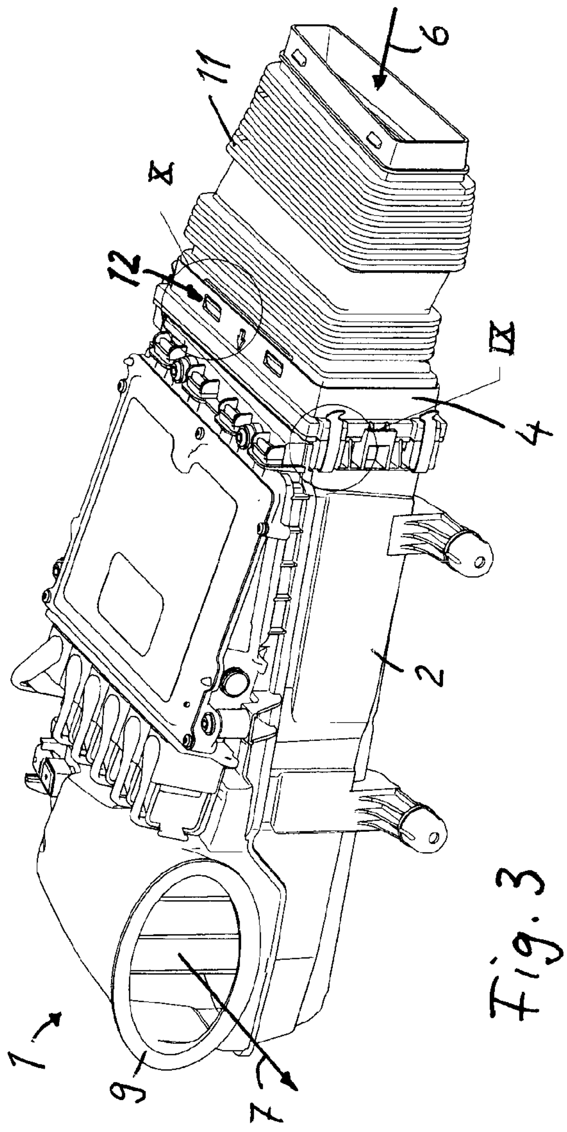
FIG. 3 is an illustration corresponding to FIG. 1 but with an air duct inserted into the frame part of the filter element.
Figure 4:
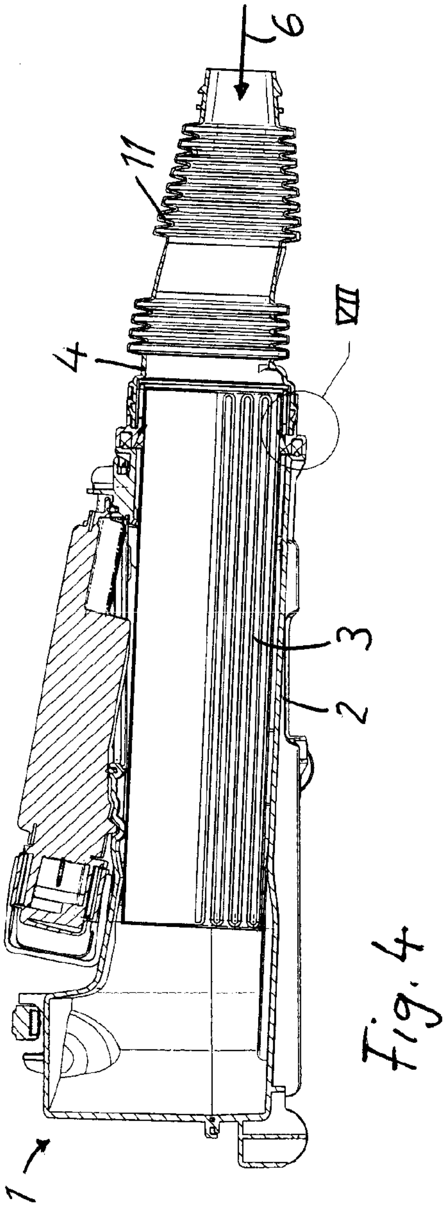
FIG. 4 shows a section view taken lengthwise through the air filter device according to FIG. 3.

In the mounted state, the frame part 4 is positioned at least substantially outside of the filter housing 2 (FIGS. 1, 3, and 4) and is connected by means of securing clips 8 with the filter housing 2. The frame part 4 forms in the area of the inflow side of the filter element 3 an air duct receptacle **4*a* (FIG. 8) for an air duct 11 (see FIGS. 3, 4) by means of which raw air can be supplied to the air filter device 1 in the direction of arrow 6. The air duct 11 is inserted into the air duct receptacle 4*a* in the frame part 4 and by means of a form-fit connection 12 is connected form-fittingly to the frame part 4**.

Figure 10:
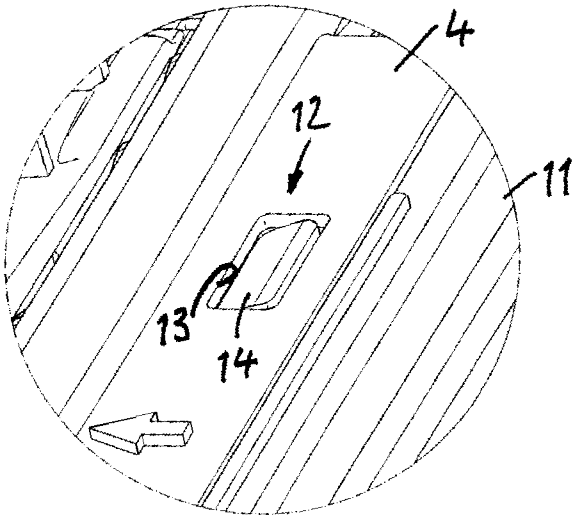
FIG. 10 shows the detail X of FIG. 3 with an illustration of the form-fit connection of the air duct on the frame part.

The form-fit connection 12, which is illustrated in FIG. 10 in detail, comprises recesses 13 in the frame part 4 as well as elastic springy locking noses 14 at the exterior side of the air duct 11 facing the end face. The locking noses 14 can be pressed elastically inward in radial direction so that an insertion of the air duct 11 is possible until form-fit locking of the locking noses 14 in the recesses 13 occurs. In the same way, the form-fit connection 12 can be released again by radially pushing the locking noses 14 out of the recesses 13. The connection between air duct 11 and frame part 4 is realized exclusively by the form-fit connection 12 and thus only between these two components 4, 11. A connection between the air duct 11 and the filter housing 2 is thus not provided. The form-fit connection 12 is located immediately outside of the opening in the filter housing 2 provided at the end face.

Figure 7:
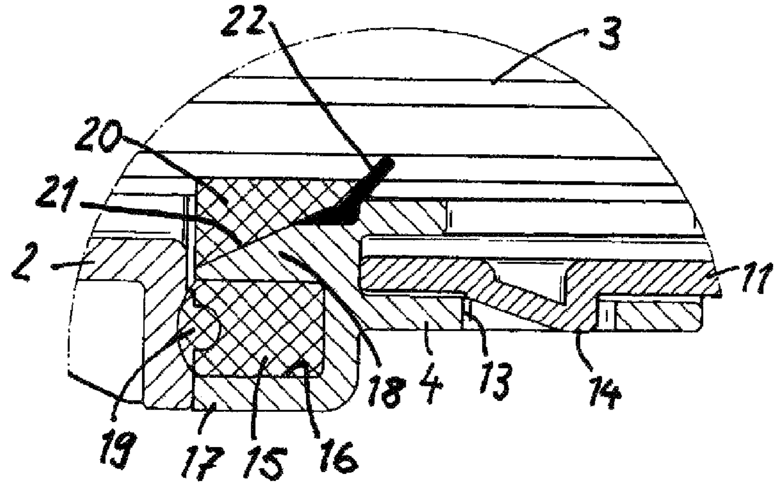
FIG. 7 shows the detail VII of FIG. 4 in an enlarged illustration, showing a sealing element at the frame part having correlated therewith a support bead at the housing as well as showing a sealing lip that delimits an adhesive receptacle between frame part and filter element.
Figure 8:
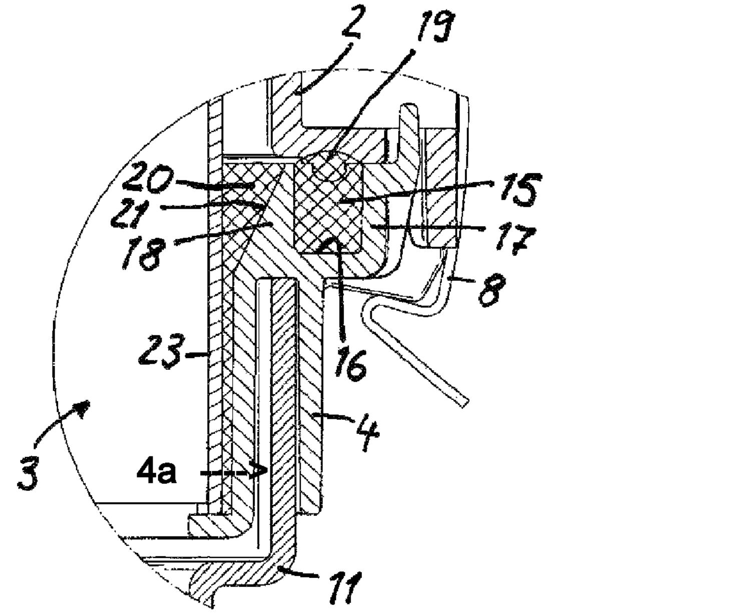
FIG. 8 shows the detail VIII of FIG. 6 in an enlarged illustration, showing the sealing element at the frame part and the support bead at the housing.

In FIGS. 7 and 8 a seal arrangement between the frame part 4 and the filter housing 2 is illustrated. The seal arrangement comprises a sealing element 15 which is inserted into a circumferentially extending receptacle 16 at the frame part 4. The receptacle 16 is open at the end face which is facing the filter housing 2 and is delimited by two legs 17 and 18 that are spaced apart from each other and are monolithically formed with the frame part 4.

On the filter housing 2, there is a support bead 19 which interacts with the sealing element 15. The support bead 19 can be monolithic with the filter housing 2 or designed as a separate component which is made of a different material than the filter housing but is connected fixedly with the filter housing 2. The support bead 19 has a mushroom shape in cross-section wherein a narrow stem of the support bead 19 is facing the sealing element 15 and is in contact therewith. The stem or leg of the support bead 19 has a smaller width compared to the sealing element 15 and loads the sealing element 15 centrally. This embodiment is sufficiently flow-tight; moreover, the risk of shearing off in the area of the sealing element 15 is significantly reduced. The sealing element 15 terminates advantageously at the end face of the legs 17, 18 so that no shearing off in the area of the end face of the sealing element 15 can occur even for a relative movement between the frame part 4 and the filter housing 2.

The support bead 19 projects past the immediately neighboring walls of the filter housing 2 and presses into the yielding material of the sealing element 15. The end face of the stem of the support bead 19 which is projecting into the sealing element 15 is rounded.

Figure 5:
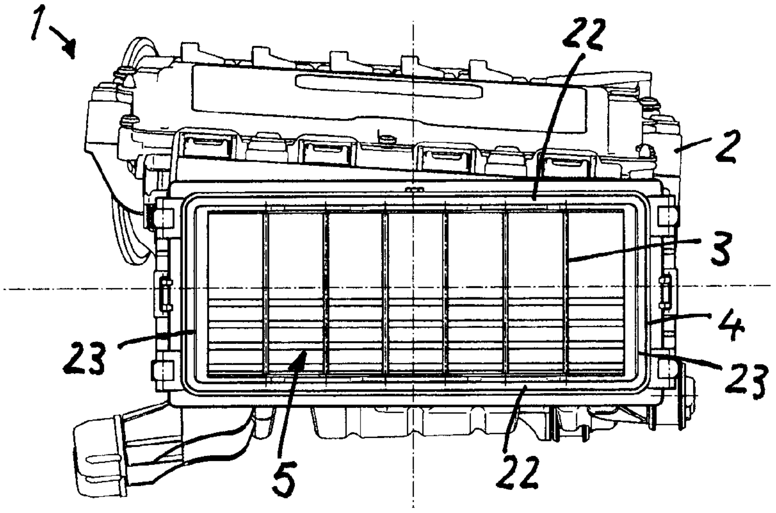
FIG. 5 is an end view of the air filter device in the area of the inflow side of the filter element.
Figure 6:
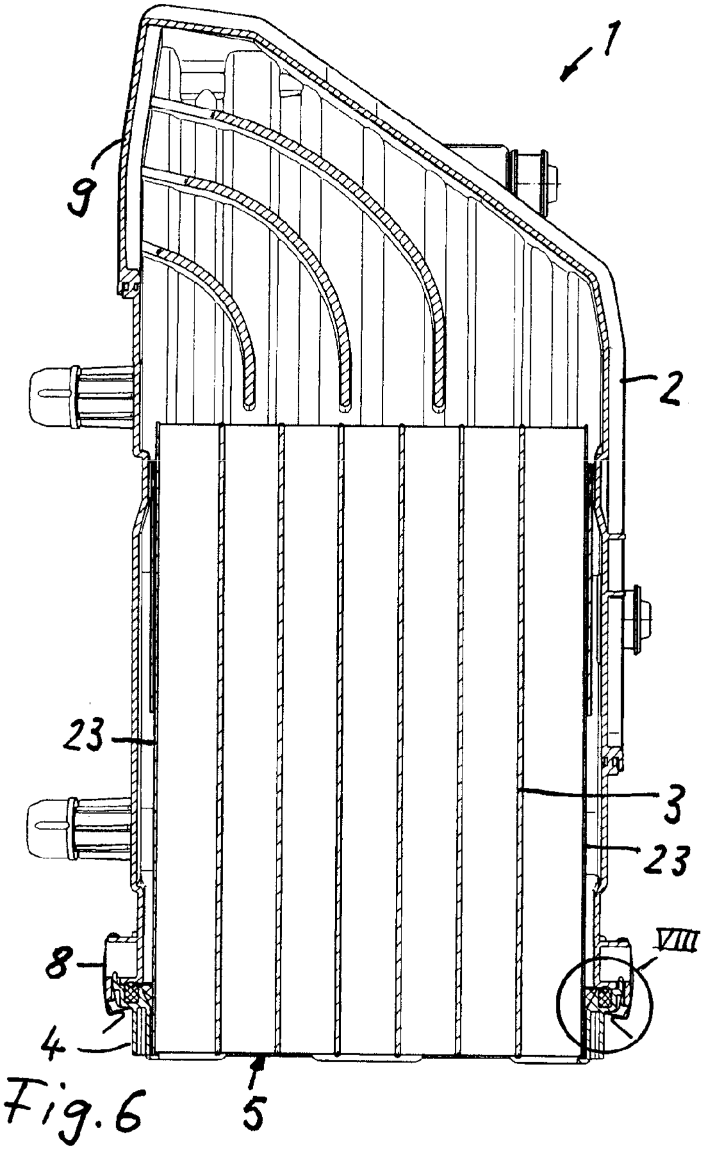
FIG. 6 shows a vertical section view through the air filter device.

Moreover, in FIGS. 7 and 8 in combination with FIGS. 5 and 6, it can be seen that the frame part 4 is adhesively connected with the filter element 3. The adhesive connection is realized by means of a circumferentially arranged adhesive fill 20 which is filled into an adhesive receptacle 21 between the frame part 4 and the filter element 3. Filling is realized in the manufacturing process while the adhesive is in the liquid state with subsequent curing. In order to avoid that during the curing process adhesive 20 will flow out of the adhesive receptacle 21 in downward direction, a sealing lip 22 (FIGS. 5, 7) is arranged at the adhesive receptacle 21. The adhesive receptacle 21 is substantially triangular in cross-section. The sealing lip 22 is connected fixedly with the frame part 4 and remains on the frame part 4 even in the cured state of the adhesive 20.

The adhesive receptacle 21 is inwardly displaced in radial direction relative to the receptacle 16 for receiving the sealing element 15 and is separated by the leg 18 from the receptacle 16 for the sealing element 15, wherein the leg 18 at the same time delimits the adhesive receptacle 21 laterally. At the base of the leg 18, the sealing lip 22 is arranged which is extending at a slant inwardly and delimits the pointedly tapering side of the adhesive receptacle. The free end face of the sealing lip 22 is positioned at the exterior circumferential surface of the filter element 3.

The sealing lip 22 is arranged at the two oppositely positioned longitudinal sides of the rectangular frame part 4 (FIG. 5). At the narrow sides of the filter element 3 there is a lateral band 23, respectively, which is connected fixedly with the filter element 3 and, in the area of the narrow sides, delimits the adhesive receptacle 21 at its pointedly tapering side (FIGS. 5, 6, and 8).

Figure 9:
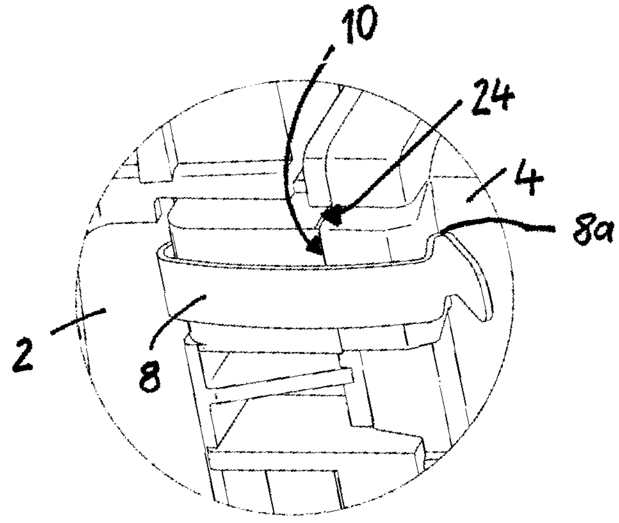
FIG. 9 shows the detail IX of FIG. 3 with a securing clip for securing the frame part on the filter housing.

In FIG. 9, the support of the frame part 4 on a counter contact surface on the filter housing 2 as well as the connection by means of the securing clips 8 is illustrated. The projecting section of the frame part 4 which is radially projecting past the filter element 3 has a support surface 10 (see also FIG. 2) which is facing away from the inflow side and, in the connected state, is resting on the counter contact surface 24 on the filter housing 2. The securing clip 8 is pivotably supported on the exterior surface of the filter housing 2 and engages in the tightened state the section of the filter housing 2 with the counter contact surface 24 as well as the projecting section of the frame part 4 with the support surface 10. The securing clip 8 is embodied to be elastic; in the tightened state a securing section 8*a* engages across a step on the frame part 4 where the support surface 10 is arranged and forces thus the frame part 4 with the support surface 10 against the counter contact surface 24 on the filter housing 2.

While specific embodiments of the invention have been shown and described in detail to illustrate the inventive principles, it will be understood that the invention may be embodied otherwise without departing from such principles.

What is claimed is:

1. An air filter device comprising:
a filter housing;
a filter element arranged in the filter housing, the filter element including:
an inflow face receiving air to be filtered, and
an opposing outflow face discharging filtered air,
a filter media extending between the inflow face and the outflow face:
wherein an axial direction is a direction from the inflow face to the outflow face of the filter element, and
a radial direction is a direction traverse to the axial direction;
wherein a first flow face is either the inflow face or the outflow face;
a frame part fixed connected to an exterior of the filter element at the first flow face and framing the first flow face of the filter element
the frame part arranged at and fixedly connected onto a radially outer surface of the filter media at the first flow face, the frame part arranged radially outwardly from and circumferentially surrounding the filter media, framing the first flow face of the filter element,
wherein the frame part at a first axial side comprises:
a first axially outwardly projecting ring circumferentially surrounding the first flow face,
a second axially outwardly projecting ring spaced radially outwardly from and circumferentially surrounding the first axially outwardly projecting ring,
space between the first and second axially outwardly projecting rings forming a circumferentially closed ring-shaped air duct receptacle surrounding the first flow face, the air-duct receptacle having a circumferential U-shaped cross section that opens axially outwardly in a direction pointing away from the filter element and the filter housing for receiving and engaging the air duct;
wherein the frame part is arranged at least partially on an exterior side of the filter housing.

2. The air filter device according to claim 1, wherein the filter element is fastened by the frame part on the filter housing.

3. The air filter device according to claim 2, further comprising
a securing clip, wherein an opposing second axial side of the frame part is fastened by the securing clip onto the filter housing.

4. The air filter device according to claim 2, further comprising
a screw wherein the frame part is fastened by the screw on the filter housing.

5. The air filter device according to claim 1, wherein the air duct is received in the air duct receptacle.

6. The air filter device according to claim 5, wherein the air duct is secured form-fittingly on the frame part.

7. The air filter device according to claim 5, wherein the air duct is inserted into the air duct receptacle,
wherein the frame part has an exterior side and is secured with the exterior side to the filter housing.

8. The air filter device according to claim 3, wherein the air duct is inserted into the air duct receptacle,
wherein the filter housing comprises a securing clip,
wherein the frame part has an exterior side,
wherein the securing clip is adapted to engage with the exterior side of the frame part to securely abut an opposing second axial side of the frame part onto to the filter housing.

9. The air filter device according to claim 5, wherein the air duct is a raw air duct supplying raw air to the filter element.

10. The air filter device according to claim 1, wherein
an opposing second axial side of the frame part faces the filter housing and has a circumferentially circumferentially closed ring-shaped seal receptacle circumferentially framing the filter element, the seal receptacle having a U-shaped cross section that opens axially towards a second flow face of the filter element in a direction away from the first flow face;
a circumferentially closed ring-shaped sealing element is arranged in the circumferentially closed seal receptacle and contacting the filter housing, sealing the opposing second axial side of the frame part to the filter housing.

11. The air filter device according to claim 10, wherein the filter housing comprises
a radially outwardly projecting flange arranged on a first axial end of the filter housing, the flange closing circumferentially about the filter housing;

a circumferential extending support bead arranged on the radially outwardly projecting flange, the support bead and projecting outwardly from the flange and into the U-shaped cross section of the circumferentially closed ring-shaped seal receptacle, the support bead pressing into elastically yielding material of the sealing element such that the sealing element is supported on the support bead.

12. The air filter device according to claim 11, wherein the frame part comprises a projecting section that is projecting past an exterior circumferential surface of the filter element and wherein the projecting section is resting on the filter housing.

13. The air filter device according to claim 1, wherein the frame part is adhesively connected to the filter element, wherein between the frame part and the filter element a sealing lip is arranged which delimits an adhesive receptacle between the frame part and the filter element.

14. The air filter device according to claim 1, wherein the air duct receptacle includes a locking recess having a circumferentially closed outer perimeter, the locking recess forming a hole extending completely through a leg of the U-shaped cross section of the air duct receptacle, wherein the air duct includes an elastic locking nose, the locking nose, when in an stalled state in the air duct receptacle, received into the locking recess, thereby locking the air duct into the air duct receptacle and securely attaching the air duct to the filter element.

* * * * *